United States Patent [19]

Ostachowski

[11] Patent Number: 5,189,804
[45] Date of Patent: Mar. 2, 1993

[54] ANGLE INDICATING INSTRUMENT

[76] Inventor: Edward Ostachowski, 1316 Canford Cresent, Mississauga, Ontario, Canada, L5J 3N1

[21] Appl. No.: 649,904

[22] Filed: Feb. 1, 1991

[51] Int. Cl.⁵ .................. B43L 7/10; G01B 3/56
[52] U.S. Cl. ......................... 33/471; 33/494; 33/538; 33/1 N
[58] Field of Search ............... 33/465, 466, 471, 421, 33/1 AP, 1 G, 452, 494, 495, 496, 558.02, DIG. 16, 534, 535, 538, 1 N, 403, 423, 424

[56] References Cited

U.S. PATENT DOCUMENTS

| | | | |
|---|---|---|---|
| 809,191 | 1/1906 | Duke et al. | 33/471 |
| 832,483 | 10/1906 | Johnson | 33/471 |
| 946,472 | 1/1910 | Stauffer | 33/451 |
| 1,086,545 | 2/1914 | Meister et al. | 33/495 |
| 1,145,719 | 7/1915 | Tucker | 33/471 |
| 1,260,292 | 3/1918 | Anderson | |
| 1,550,755 | 8/1925 | Steinle | 33/471 |
| 1,585,563 | 5/1926 | Schlattau | 33/471 |
| 1,655,887 | 1/1928 | Bailey | |
| 1,857,129 | 5/1932 | Ahola | 33/465 |
| 1,895,834 | 1/1933 | Hamilton | 33/471 |
| 2,735,185 | 2/1956 | Naphtal | 33/497 |
| 2,825,970 | 3/1958 | Miyamoto | 33/423 |
| 3,270,420 | 9/1966 | Simril | 33/471 |
| 3,942,252 | 3/1976 | Roach et al. | 33/75 R |
| 4,144,650 | 3/1979 | Rawlings et al. | 33/88 |
| 4,394,801 | 7/1983 | Thibodeaux | 33/471 |
| 4,442,606 | 4/1984 | Graham et al. | 33/471 |
| 4,562,649 | 1/1986 | Ciavarella | 33/419 |
| 4,608,761 | 9/1986 | Small | 33/471 |
| 4,733,477 | 3/1988 | Fincham et al. | 33/451 |
| 4,744,152 | 5/1988 | Roach et al. | 33/471 |
| 4,745,689 | 5/1988 | Hiltz | 33/471 |
| 4,866,848 | 9/1989 | Agelidis | 33/558.02 |
| 4,901,444 | 2/1990 | Maschmeier | 33/465 |
| 5,117,560 | 6/1992 | Nevins | 33/471 |

FOREIGN PATENT DOCUMENTS 9008938 8/1990 PCT Int'l Appl. .............. 33/1 N

*Primary Examiner*—William A. Cuchlinski, Jr.
*Assistant Examiner*—Alvin Wirthlin
*Attorney, Agent, or Firm*—Donald E. Hewson

[57] ABSTRACT

An angle indicating instrument for indicating an angle to be used in the cutting and subsequent joining of pieces of material is disclosed. A first arm and a second arm of the angle indicating instrument are positioned so as to engage the angle indicating instrument in an engaged angle, which is the angle between the two pieces of material to be joined. The indicated angle is a calculated angle and is calculated based on the engaged angle.

4 Claims, 2 Drawing Sheets

FIG. 3.
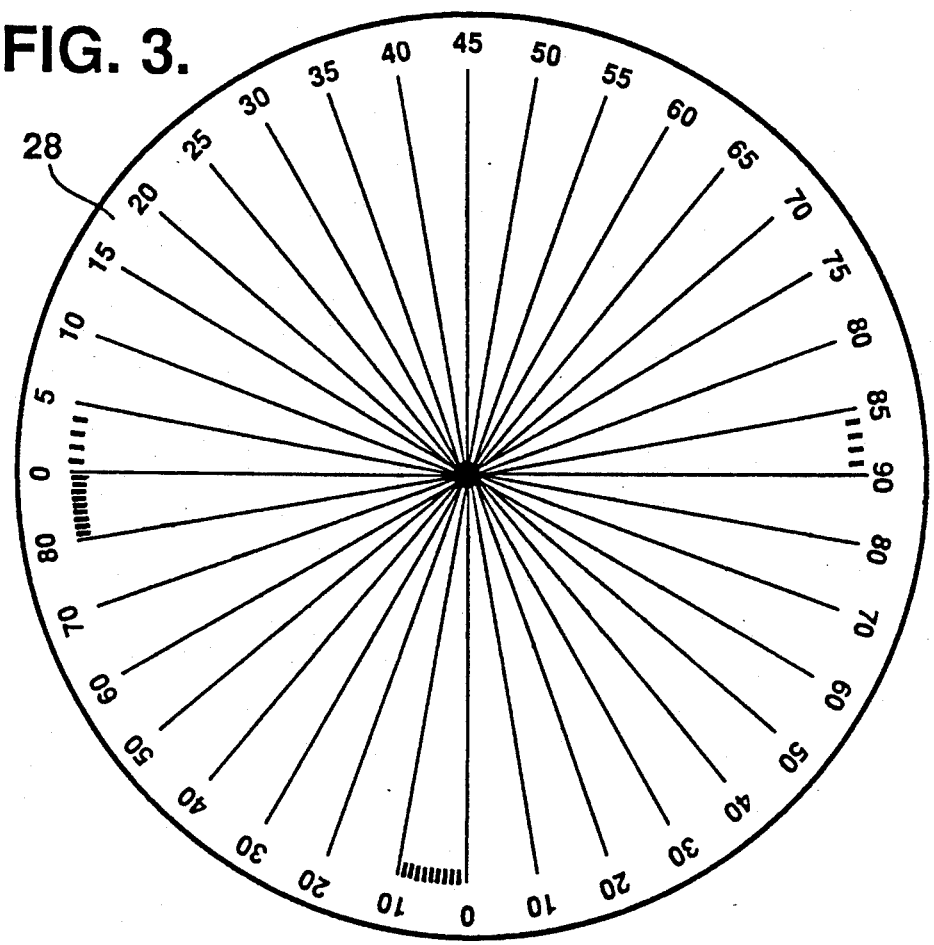
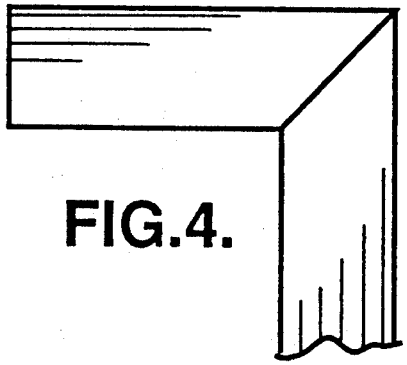
FIG.4.
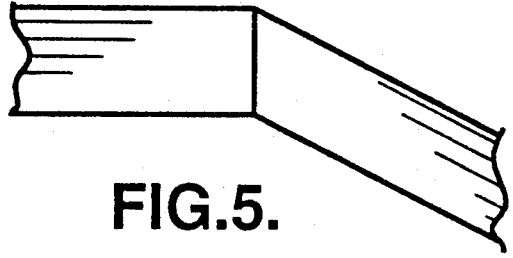
FIG.5.

ANGLE INDICATING INSTRUMENT

FIELD OF THE INVENTION

This invention relates to measuring devices and more particularly to measuring devices used to indicate angles between lines, surfaces and the like. In the particular application, the angle engaged by the instrument and the angle indicated by the instrument are different in that the angle indicated is an adaptation based on the angle that is engaged.

BACKGROUND OF THE INVENTION

Since prehistoric times, mankind has used instrument tools to perform certain tasks that would not be possible or very difficult to do—or at very least an inferior result would be produced—without tools. Such tools include tools for cutting, shaping, folding, measuring, and so on. Tools are typically designed to make a particular job more easy, and more expedient than if the tool was not used, and very often the task at hand is performed better as a result of using a proper tool. Over many centuries, tools have evolved so as to provide better ways to perform tasks than would be possible without tools. Indeed, not only can tools provide better ways of performing tasks, they can help achieve better results. They may even be able to provide results in situations where useful results could not be achieved without tools.

One very important function that a tool can perform is that of combining operations in a manner that simplifies the realization of an end result. Such a tool may indeed combine two functions into one tool, such as holding and shaping an object, or holding and measuring an object. In either of these cases, the tool is performing a function that might otherwise be done by more than one tool or by tool and possibly by a person's hand. Ultimately, the end result of shaping, measuring, or whatever, is or easily and accurately achieved through use of a tool that provides multiple functions.

Indeed, some tools perform functions that simply can not be achieved without the use of that tool, or at least some similar tool. One subject sample of this kind of tool is a measuring device, whether it be for measuring linear distances, angles, or even something more complicated such as rates of flow, sound pressure level, illumination, and so on.

For the simple matter of measuring distances, it is not possible to accurately measure a distance without some sort of scale. A scale provides a reference, wherein a basic unit of reference is determined and a contiguous series of such units is used to form the scale. Such a scale can be found on a simple common ruler, tape measure, and the like. Coupled with the scale on such a measuring device are numbers. Typically, a cardinal number system is used to indicate how many of the basic units of measure are realized at any point along the scale, the number indicating how many of the basic units of measure are between the given point and starting point, with a starting point usually labeled as zero.

It is simply not possible to accurately measure a distance without such a scale, because there is no reference to compare the distance to. Whether the comparison be made visually or otherwise, it is indeed possible to estimate the size of an object without the use of a scale, but such an estimate is made by comparison of the object with generally similarly sized object of roughly knowing measurement, and is therefore inherently inaccurate, at least to a degree. In order to measure an object accurately, direct comparison to a scale must be used.

As mentioned, one example of such a scale is simple rule that measure linear distances in centimeters, inches, or similar. Another common type of measurement is the measurement of angles. Angular scales of measurement are reasonably analogous to linear scales of measurement in that a set base measurement is used, with such a set base measurement being replicated in a contiguous manner to form an ongoing scale. In the case of angular measurement, the units of measurement are usually with reference to a circle, with a circle being divided into an equal number of divisions. Any two lines, surfaces, or the like, that intersect do so at an angle, with the angle being measurable in terms of these divisions of a circle. The most commonly used scale for measuring angles is a "degree" scale, wherein a circle is divided into 360 equal divisions, each division being named a "degree". An angle that is between two intersecting lines, or the like, wherein the angular displacement between the two lines, surfaces or the like is equivalent to one quarter of a circle, would have an angular measurement of 90°. Under many circumstances, the direct measurement of such an angle is adequate and can be measured by an angular scale that indicates this measurement directly. Such an angular scale is commonly known as a protractor.

Many different kinds of protractors are commonly available. The most simple kind is one that is circular or semicircular and has no moving parts. An angular scale is part of the protractor, and the protractor is simply placed against a pair of intersecting lines, or the like, and the angle between such lines can be read directly from the angular scale on the protractor.

There are instances, however, where it is more useful to have an indicated measurement that is different than an actual measurement. The most simple example of this is the measurement of a drawing that is represented in a reduced scale. Using a ruler having a similarly reduced scale to measure the drawing gives a direct indication of the actual size of an object represented in the drawing, even though this is not the actual distance on the drawing. By this method, an object of any size can be represented in a more appropriate size, at a given scale. Such a procedure of using a reduced scale is often used in engineering drawings, architectural drawings, and the like.

Another example of a scale indicating a converted type of measurement is a simple speedometer on a car, wherein the displacement of a pointer along a scale, whether the scale be angular or linear, indicates the speed that the car is travelling at.

Such adjusted and adapted scales present useful information in a manner that is most convenient for the user. There is little or no conversion that is necessary in order to use the information gained from the scale.

It is believed that the conversion of angular scales is much less common than with linearly based scales. The fundamental reason behind this is that if a representation of an angle is made at an enlarged or reduced scale the actual angle remains unchanged. Resultingly, the same scale can be used to measure virtually any angle.

One possibility for requiring an altered angular scale, wherein the indicated angle may be different than the actual measured angle, is where some sort of mathematical computation would need to be performed on the actual measured angle in order to obtain a useful result.

Such an example of this is the formation of a double bevelled corner, wherein two pieces of material are each cut at an angle that is equal to one half of the actual angle between the two pieces of material to be joined. If this angle is 90°, such as on a picture frame, each piece of material is cut at a 45° angle. It is, of course, possible to measure the 90° angle directly, and simply divide it by a factor of two in order to obtain the resulting angle of 45°. It would be more convenient, however, to have a measuring instrument that actually indicates the required 45° angle of cutting.

Another similar type of angle is a single bevelled angle, wherein in two pieces of material are joined together in a similar but slightly different manner than in a doubled bevelled angle. In a single bevelled angle, one piece of material is cut at end thereof at a desired angle—this angle being the same angle that the piece extending therefrom is to be directed at. The piece of material to be adjoined thereto contacts this bevelled surface along its side. In order to calculate the angle that a piece of material would be cut at for a single bevelled angle, the angle between two joining surfaces of the two pieces of material is measured. If the angle therebetween is acute, the complement of that angle is used. If the angle therebetween is obtuse, an angle that is 90° less than the complement is used.

DESCRIPTION OF THE PRIOR ART

U.S. Pat. No. 4,394,801 to Thibodeaux discloses a construction tool that is used to measure the relative angle between two lines or surfaces or between horizontal or vertical and such a line or surface. It also indicates roof pitch on a separate scale. Bubble type levels are included to orient the construction tool with respect to horizontal or vertical.

U.S. Pat. No. 4,562,649 to Ciavarella discloses an adjustable carpenter's square for use determining the relative angle between two lines or surfaces. The absolute angle between the two lines is indicated, and is viewed through opening 31.

U.S. Pat. No. 4,745,689 to Hiltz discloses a measuring and layout tool that has a plurality of levels therein and indicates the relative angle between two lines or surfaces.

U.S. Pat. No. 4,144,650 to Rawlings et al discloses a multifunction level that again shows the relative angle between two lines or surfaces. This level can be locked at a particular angle, if desired, with the locking mechanism accessible from either side of the level, thus making it easier to use.

U.S. Pat. No. 2,735,185 to Naphtal discloses a protractor that is used to measure angles between two lines or surfaces. The angle of the protractor is lockable thereby also allowing it to be usable to recreate the angle in order to draw it accurately on paper or wherever. The angle is viewed through a magnifying bubble located above the scale.

U.S. Pat. No. 1,655,887 to Bailey discloses a protractor that may be used to very accurately measure angles between two lines or surfaces or to very accurately measure very small angles, and works in the following manner. As the blades 5 and 6 are moved angularly with respect to one another, gear teeth 9, which are part of ring 7 that is in turn attached to blade 5, cause the free turning gear 11 to rotate. Gear 11 is part of the plate 10 that is attached to blade 6. Gear 11 meshes with gear 12 and causes it to turn. Rigidly attached to gear 12 is plate 13. Plate 13 is caused to be angularly displaced at a much greater rate then the two blades 5 and 6 are separated at. This is because the ratio of the gear teeth on gears 9, 11 and 12 cause gear 12 to move at an angular speed that is greater than gear 9.

U.S. Pat. No. 1,585,563 to Schlattau discloses a combination measuring instrument that measures the relative angle between two lines or surfaces, and provides a linear measuring scale, a means for measuring the outside diameter of an object, and also a scale that is used to measure the diameter of a bolt or a piece of wire. The scale for measuring a bolt or a piece of wire is an enlarged scale.

U.S. Pat. No. 1,550,755 to Steinle discloses an angulometer that is used to measure the relative angle between two lines or surfaces, including a magnifying lens to allow a very fine angular scale to be read easily.

U.S. Pat. No. 4,733,477 to Fincham et al discloses a chalk line framing square that provides a device that is designed to aid in placing right angle intersecting chalk lines upon a floor so that tiles can be properly installed on the floor. It includes two arms that pivot with respect to one another and an angular scale that indicates the angle between the two arms.

SUMMARY OF THE INVENTION

The present invention provides a measuring device that can physically engage itself to the angle between two lines, surfaces, and the like, and subsequently indicate a calculated measurement directly related to the engaged angle. One angle that is indicated is the angle that is complementary to one half of the engaged angle. This indicated angle is the angle that each of the two pieces of raw material would need to be cut at in order to form a double bevel, such as that found in a typical picture frame. Another angle that is indicated is an angle that is complementary to the engaged angle if the engaged angle is acute, and that is 90° less than the engaged angle if the engaged angle is obtuse. This can be used to form a single bevel angle.

It is important to correctly determine these angles that are used to cut the pieces of material correctly and it is easier and quicker to make such a determination directly from a scale on an instrument rather than having to calculate such angles.

BRIEF DESCRIPTION OF THE DRAWINGS

Embodiments of the invention will now be described by way of example in association with the accompanying drawings in which:

FIG. 3 is an enlarged view of the scales used on the instrument;

FIG. 4 is a view of a typical double bevelled corner; and

FIG. 5 is a view of a typical single bevelled corner.

DETAILED DESCRIPTION OF THE PREFERRED EMBODIMENTS

Figure 1:
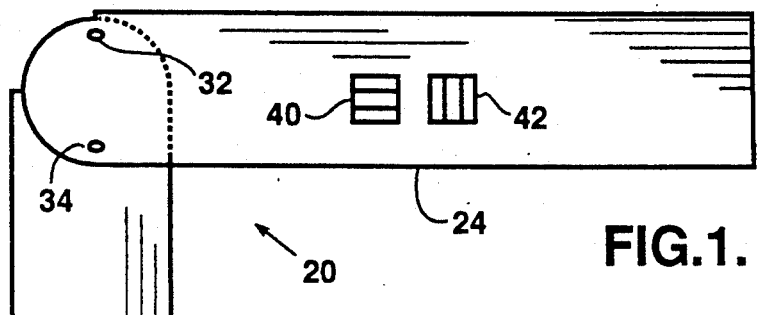
FIG. 1 is a plan view of the measuring device of the present invention.
Figure 2:
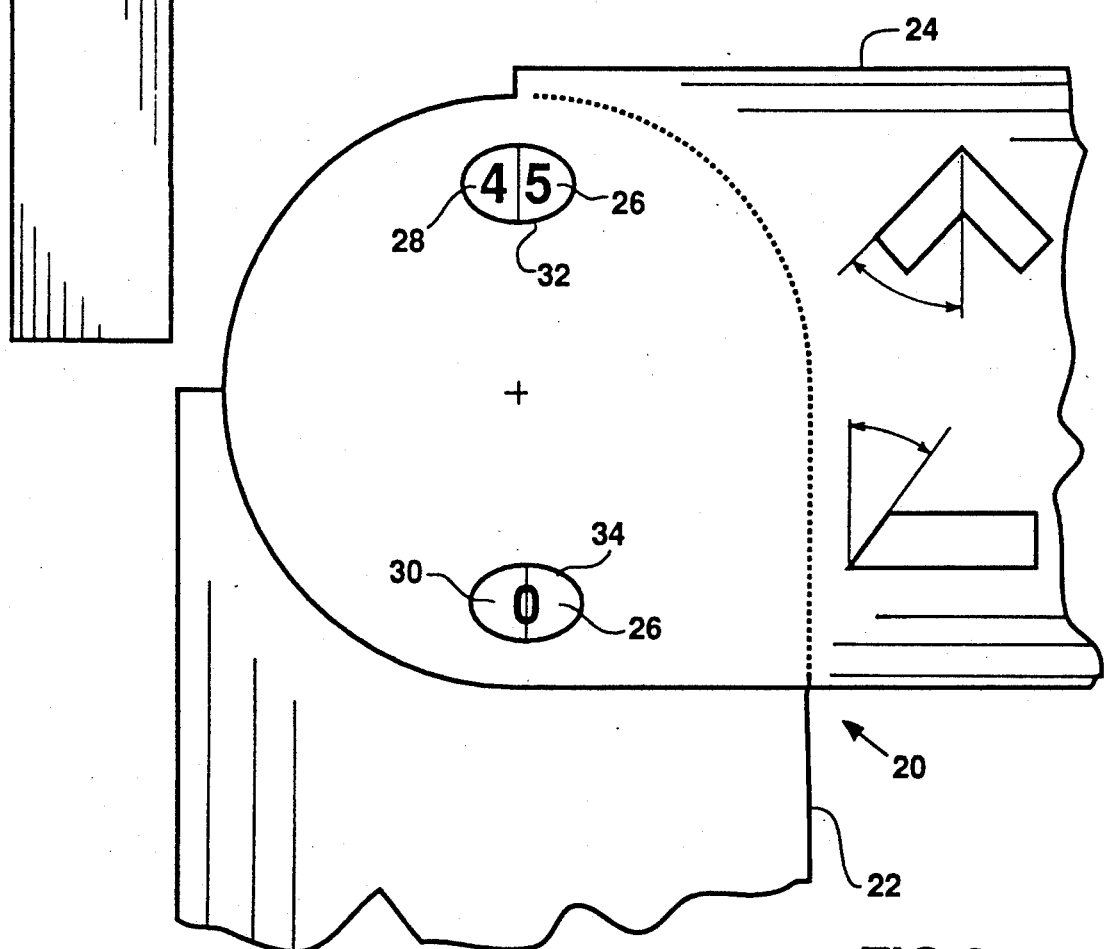
FIG. 2 is an enlarged view of a portion of FIG. 1.

Reference will now be made to FIGS. 1, 2, and 3 which show the indicating instrument 20 having a first arm 22 and a second arm 24. The first arm 22 and the second arm 24 are joined together in angularly variable relation to one another. Preferably, the first arm 22 and second arm 24 are joined in pivotable relation one to the other, by means such as a bolt and nut arrangement or a pin or rivet arrangement. Found on the first arm 22 is an angle indicating means 26, which on the preferred embodiment comprises a first scale 28 and a second scale 30. In the preferred embodiment, the first scale 28 makes up one half the angle indicating means 26 and the second scale 30 makes up the other half of the angle indicating means 26.

The second arm 24 is provided with at least one reference means that is used to read the appropriate angle on the angle indicating means 26. In the preferred embodiment, there is a first reference means 32 that indicates the appropriate angle on the first scale 28 and a second reference means 34 that indicates the appropriate angle on the second scale 30. Each of the reference means 32, 34 may be something as simple as a line or an arrow, especially if the second arm 24 is transparent so as to not cover the first and second scale 28, 30 on first arm 22 or if the first and second scale 28, 30 are outside of the area of the second arm 24. Alternatively, the first and second reference means 32, 34 may comprise appropriately placed openings in second arm 24 such that the angle that is visible through these openings is the appropriate angle. In the preferred embodiment, each of the reference means 32, 34 comprises an opening in second arm 24, with a magnifying lens used in conjunction therewith to aid in reading the angle. The remainder of the first and second scales on first arm 22 are covered by a portion of the second arm 24.

In use, the indicating instrument 20 is made to physically engage the angle between one line or surface and another line or surface, by placing the first arm 22 against or along one line or surface and the second arm 24 against or along the other line or surface. The angle indicating means 26 indicates the appropriate angle on either first scale 28 or second scale 30, the appropriate angle being an adaptation based on the angle displaced by the first and second arms 28, 30.

The reason that a direct measurement of the actual angle between the two pieces of material to be joined cannot be used, or at least cannot be used easily, is that this angle is typically measured between two edges of the pieces of material. However, the cut that is made in the one piece of material is usually measured with respect to a line perpendicular to that edge of the material—in other words across the material. This means that the reference used to measure the angle for cutting and the reference used to measure the angle between the two pieces of material to be joined are offset by 90°.

The first scale 28 is a scale that indicates an angle that is the complement of from 0° to 90° displaced over an angular range of 180°. It therefore indicates one half of the angle that is actually being measured by the indicating instrument 20. The reason for this is best seen in FIG. 4, which shows 2 pieces of material joined using a double bevel. It can be fairly readily seen that the angle between these two pieces of material is 90°. In order that the ends of these pieces of material mate properly each piece of material would have to be cut at 45°, which is the complement of one half of the 90° angle between the two pieces of material. For this angle, the indicated complementary angle also happens to be equal to one half of the measured angle. If the indicating instrument 20 of the present invention were to be used to measure this 90° angle, a 45° angle would be indicated by the first scale 28. This 45° angle could be used directly in cutting the pieces of material without first having to perform any calculations.

Second scale 30 is a scale that allows for the direct reading of the angle that should be used to join two pieces of material using a single bevel. In a single bevel, a piece of material is joined to another piece of material at a given angle, and only one piece of material will have an angular cut in it. This can be best seen in FIG. 5. The reason that a direct measurement of the actual angle between the two pieces of material to be joined cannot be used, or at least cannot be used easily, is that this angle is typically measured between two opposed surfaces edges of the pieces of material, with the surface or edge of the piece of material being cut being one reference. However, the cut that is made in the one piece of material is usually measured with respect to a line perpendicular to that surface or edge of the material—in other words across the material, with the line perpendicular to that surface or edge being another reference. This means that the reference used to measure the angle for cutting and the reference used to measure the angle between the two pieces of material to be joined are offset by 90°. The second scale 30 correctly indicates the required cutting angle takes this into account by indicating an angle that is complementary to the measured angle for acute angles, and an angle that is the complement of the angle that is 90° less than the measured angles for obtuse angles. Again, the reading from the scale can be used directly in cutting the piece of material, with no further calculations.

As can be seen in FIG. 1, there are two levels 40, 42 located in the second arm 24. These levels are for determining an engaged angle with respect to vertical or horizontal. Further, it is possible to have a level therein that is rotatable to any angle and has an accompanying scale to indicate such an angle. This level could be used for determining an engaged angle that is skewed an any angle with respect to horizontal or vertical.

Other modifications and alterations may be used in the design and manufacture of an angle indicating instrument of the present invention without departing from the spirit and scope of the accompanying claims.

I claim:

1. An angle indicating instrument, wherein said instrument is adapted for engagement over a range of angles of from slightly greater than 0° up to 180°, any such angle being referred to as the engaged angle when engaged by said instrument, wherein said engaged angle relates to a piece of material to be cut, and wherein said instrument is used to directly indicate and specifically refer to a cutting angle of a beveled cut to be made in said piece of material; said angle indicating instrument comprising:

a first arm;
a second arm;
said first and second arms being joined together in angularly variable relation to one another, with the angle between said first arm and said second arm being said engaged angle; wherein said first arm has an angle indicating means for indicating angles that are the complement of one half of said engaged angle, and that are to be used for forming a beveled cut to be made in said piece of material to be cut in order to adapt said piece of material for beveled adjoinment to another piece of material, wherein said angle indicating means comprises a first scale on a first surface of said first arm, and wherein said first scale is a scale that has angle readings of from 0° to 90° that are evenly displayed over a range of 180°;

and wherein said angle indicating means comprises a second scale on said first surface opposite said first scale, and wherein said second scale indicates an angle that is complementary to said engaged angle for acute values of said engaged angle, and indicates an angle that is 90° less than said engaged angle for obtuse values of said engaged angle over a range of 180°; and a reference means on said second arm for simultaneously reading an angle on said first and second scales.

2. The angle indicating instrument of claim 1, wherein said reference means comprises first and second openings in said second arm to read said first and second scales, respectively.

3. The angle indicating instrument of claim 2, wherein each of said first and second openings has a magnifying lens associated therewith.

4. The angle indicating instrument of claim 1, wherein each of said first and second scales is an angular analogue scale.

* * * * *